(12) United States Patent
Kukkonen et al.

(10) Patent No.: US 10,407,304 B2
(45) Date of Patent: Sep. 10, 2019

(54) USE OF METHANOL IN THE PRODUCTION OF HYDROGEN AND FUEL, PROCESSES AND PLANTS FOR THE PRODUCTION OF HYDROGEN AND FUEL

(71) Applicant: UPM-KYMMENE OYJ, Helsinki (FI)

(72) Inventors: Petri Kukkonen, Helsinki (FI); Pekka Knuuttila, Porvoo (FI); Pekka Jokela, Espoo (FI)

(73) Assignee: UPM-KYMMENE OYJ, Helsinki (FI)

( * ) Notice: Subject to any disclaimer, the term of this patent is extended or adjusted under 35 U.S.C. 154(b) by 82 days.

(21) Appl. No.: 14/963,991

(22) Filed: Dec. 9, 2015

(65) Prior Publication Data

US 2016/0083252 A1    Mar. 24, 2016

Related U.S. Application Data

(63) Continuation of application No. 12/742,213, filed as application No. PCT/EP2008/064675 on Oct. 29, 2008, now abandoned.

(30) Foreign Application Priority Data

| Nov. 9, 2007 | (FI) | 20075794 |
| Apr. 30, 2008 | (FI) | 20085400 |
| Jul. 4, 2008 | (FI) | 20085697 |

(51) Int. Cl.
*C01B 3/32* (2006.01)
*C01B 3/38* (2006.01)
(Continued)

(52) U.S. Cl.
CPC .............. *C01B 3/323* (2013.01); *C01B 3/382* (2013.01); *C01B 3/48* (2013.01); *C01B 3/52* (2013.01);
(Continued)

(58) Field of Classification Search
CPC .................. C01B 2203/063; C01B 2203/1223
(Continued)

(56) References Cited

U.S. PATENT DOCUMENTS

| 4,038,172 A | 7/1977 | Ueda et al. |
| 4,188,260 A * | 2/1980 | Rowlandson ........ D21C 9/1052 |
| | | 162/16 |

(Continued)

FOREIGN PATENT DOCUMENTS

| CA | 1088957 | 11/1980 |
| CN | 1373082 A | 10/2002 |

(Continued)

OTHER PUBLICATIONS

Olah, G.A., et al, "Superacids," Wiley-Interscience, 1985, Chapter 5.

(Continued)

*Primary Examiner* — Matthew J Merkling
(74) *Attorney, Agent, or Firm* — Cantor Colburn LLP (57) ABSTRACT

The invention relates to the use of biomethanol from the pulp industry in the production of biohydrogen. The preferred biomethanol comprises purified biomethanol derived from black liquor. The invention also relates to a process for the production of biohydrogen from crude biomethanol recovered from black liquor and to a process for producing hydrocarbon biofuel using such biohydrogen as a hydrogen source. The invention further relates to a biofuel production facility for producing fuel from biohydrogen and biohydrocarbon, and to biofuel so produced. The invention makes it possible to produce a biofuel, wherein 100% of the raw material stems from non-fossil sources.

6 Claims, 3 Drawing Sheets

(51) Int. Cl.
*C01B 3/48* (2006.01)
*C01B 3/52* (2006.01)
*C01B 13/02* (2006.01)
*C02F 1/00* (2006.01)
*C10G 2/00* (2006.01)
*C10G 3/00* (2006.01)
*C10G 45/58* (2006.01)
*C10J 3/00* (2006.01)
*D21C 11/06* (2006.01)
*C10K 1/10* (2006.01)
*C10K 3/04* (2006.01)
*C10L 1/04* (2006.01)
*C02F 3/00* (2006.01)
*C02F 101/34* (2006.01)
*C02F 103/02* (2006.01)
*C02F 103/16* (2006.01)
*C02F 103/28* (2006.01)
*C02F 103/36* (2006.01)
*D21C 11/00* (2006.01)

(52) U.S. Cl.
CPC .......... *C01B 13/0248* (2013.01); *C02F 1/00* (2013.01); *C10G 2/30* (2013.01); *C10G 2/32* (2013.01); *C10G 3/00* (2013.01); *C10G 3/50* (2013.01); *C10G 45/58* (2013.01); *C10J 3/00* (2013.01); *C10K 1/101* (2013.01); *C10K 3/04* (2013.01); *C10L 1/04* (2013.01); *D21C 11/06* (2013.01); *C01B 2203/0233* (2013.01); *C01B 2203/0244* (2013.01); *C01B 2203/0283* (2013.01); *C01B 2203/043* (2013.01); *C01B 2203/048* (2013.01); *C01B 2203/049* (2013.01); *C01B 2203/0415* (2013.01); *C01B 2203/0465* (2013.01); *C01B 2203/1223* (2013.01); *C01B 2210/0046* (2013.01); *C02F 3/00* (2013.01); *C02F 2101/34* (2013.01); *C02F 2103/023* (2013.01); *C02F 2103/16* (2013.01); *C02F 2103/28* (2013.01); *C02F 2103/365* (2013.01); *C10G 2300/1003* (2013.01); *C10G 2300/1011* (2013.01); *C10J 2300/0916* (2013.01); *C10J 2300/0959* (2013.01); *C10J 2300/16* (2013.01); *C10J 2300/169* (2013.01); *C10J 2300/1659* (2013.01); *C10J 2300/1678* (2013.01); *C10L 2200/0469* (2013.01); *C10L 2290/42* (2013.01); *C10L 2290/54* (2013.01); *D21C 11/0007* (2013.01); *Y02E 20/16* (2013.01); *Y02E 20/18* (2013.01); *Y02E 50/32* (2013.01); *Y02P 20/145* (2015.11); *Y02P 30/20* (2015.11)

(58) Field of Classification Search
USPC .................................................. 48/61, 197 R
See application file for complete search history.

(56) References Cited

U.S. PATENT DOCUMENTS

| | | | |
|---|---|---|---|
| 4,222,855 A | 9/1980 | Pelrine et al. | |
| 4,229,282 A | 10/1980 | Peters et al. | |
| 4,247,388 A | 1/1981 | Banta et al. | |
| 4,592,762 A | 6/1986 | Babu et al. | |
| 4,648,956 A | 3/1987 | Marshall et al. | |
| 4,906,671 A | 3/1990 | Haag et al. | |
| 4,968,325 A | 11/1990 | Black et al. | |
| 4,992,605 A | 2/1991 | Craig et al. | |
| 5,093,102 A | 3/1992 | Durand et al. | |
| 5,336,819 A | 8/1994 | McAuliffe et al. | |
| 5,450,892 A | 9/1995 | Gautreaux, Jr. | |
| 5,705,722 A | 1/1998 | Monnier et al. | |
| 5,718,810 A | 2/1998 | Robbins et al. | |
| 5,830,314 A * | 11/1998 | Mattsson | B01D 1/26 159/17.1 |
| 5,833,837 A | 11/1998 | Miller | |
| 6,090,312 A | 7/2000 | Ziaka et al. | |
| 7,232,935 B2 | 6/2007 | Jakkula et al. | |
| 7,279,018 B2 | 10/2007 | Jakkula et al. | |
| 2001/0026782 A1 | 10/2001 | Wang et al. | |
| 2002/0007595 A1* | 1/2002 | Maier-Roeltgen | B01B 1/005 48/116 |
| 2002/0045010 A1 | 4/2002 | Rohrbaugh et al. | |
| 2003/0121200 A1* | 7/2003 | Iijima | C07C 41/09 44/448 |
| 2004/0063798 A1 | 4/2004 | Erikstrup et al. | |
| 2004/0102315 A1 | 5/2004 | Bailie et al. | |
| 2004/0180971 A1 | 9/2004 | Inoue et al. | |
| 2004/0230085 A1 | 11/2004 | Jakkula et al. | |
| 2005/0056661 A1* | 3/2005 | Casamatta | H01M 8/04089 222/3 |
| 2007/0068848 A1 | 3/2007 | Monnier et al. | |
| 2007/0209966 A1* | 9/2007 | Abhari | C10G 2/32 208/58 |
| 2007/0225383 A1 | 9/2007 | Cortright et al. | |
| 2010/0317905 A1 | 12/2010 | Kukkonen et al. | |

FOREIGN PATENT DOCUMENTS

| | | |
|---|---|---|
| DE | 10049377 A1 | 4/2002 |
| EP | 1787951 | 5/2007 |
| FI | 100248 B | 10/1997 |
| RU | 2101273 | 1/1998 |
| RU | 2122991 | 12/1998 |
| RU | 2189968 | 9/2002 |
| WO | WO 2006/131293 | 12/2006 |

OTHER PUBLICATIONS

Ekbom, et al., "High Efficient Motor Fuel Production from Biomass via Black Liquor Gasification," XV International Symposium on Alcohol Fuels, Sep. 26, 2005, Retrieved from http://www.methanol.org/pdf/ISAFXVPaperEkbom.pdf.
Demirbas, "Pyrolysis and steam gasification processes of black liquor," Energy Conversion and Management, Elsevier Science Publishers, Oxford, GB, vol. 43, No. 7, May 1, 2002, pp. 877-884.
Cortright, R., et al., "Hydrogen from catalytic reforming of biomass-derived hydrocarbons in liquid water," Nature, Nature Publishing Group, London, UK, vol. 418, Aug. 29, 2002, pp. 964-967.
Davda, et al., "A review of catalytic issues and process conditions for renewable hydrogen and alkanes by aqueous-phase reforming of oxygenated hydrocarbons over supported metal catalysts," Applied Catalysis B: Environmental, Elsevier, vol. 56, No. 1-2, Mar. 10, 2005, pp. 171-186.
Chinese Patent Office Action for CN 200880123999.1 dated May 2, 2012 (English translation only).
Russian Office Action issued in RU Application No. 2010119343/05 (027486).
Dolgov B.N. "Kataliz v organicheskoy khimii (catalysis in the organic chemistry", 1949, pp. 52-53.
EP Communication of a notice of opposition, May 8, 2013, EP Patent No. 2229339.
Nouri, S. et al., "Evaluating synthesis gas based biomass to plastics (BTP) technologies," Department of Energy arid Environment, Environmental Systems Analysis Division (ESA), Chalmers University of Technology, Sweden 2005, 67 pages.
Cortright, R.D. et al., "Hydrogen from catalytic reforming of biomass-derived hydrocarbons in liquid water," *Nature*, vol. 418, Aug. 29, 2002, pp. 964-967.
Demirbas, A., "Pyrolysis and steam gasification processes of black liquor," *Energy Conversion and Management*, vol. 43, 2002, pp. 877-884.
Davda, R.R. et al., "A review of catalytic issues and process conditions for renewable hydrogen and alkanes by aqueous-phase reforming of oxygenated hydrocarbons over supported metal catalysts," *Applied Catalysis*, vol. 56, 2005, pp. 171-186.

(56) References Cited

OTHER PUBLICATIONS

Ekbom, T., "High Efficient Motor Fuel Production from Biomass via Black Liquor Gasification," Presentation at ISAF XV—International Symposium on Alcohol Fuels, Sep. 26-28, 2005, San Diego, CA, USA.
Lattner, J. et al., "Autothermal reforming on methanol: Experiments and modeling," *Catalysis Today*, vol. 120, 2007, pp. 78-89.
WIKIPEDIA_Fischer-Tropsch-process_Nov. 8, 2007.
WIKIPEDIA_Fischer-Tropsch-process_Jun. 27, 2008.
Dunleavy, John, "Sulfur as a Catalyst Poison", Platinum Metals Rev., 2006, 50 (2), p. 110.
English Abstract of Finnish Patent No. 960525; Date of Publication: Aug. 6, 1997; 1 Page.
International Search Report; International Application No. PCT/EP2008/064675; International Filing Date; Jul. 24, 2009; dated Aug. 27, 2009; 3 Pages.
Written Opinion of the International Searching Authority; International Application No. PCT/EP2008/064675; dated Aug. 27, 2009; 6 Pages.
Ilinich, et al. "A New Palladium-Based Catalyst for Methanol Steam Reforming in a Miniature Fuel Cell Power Source", Platinum Metals Rev., 2008, 52, (3), pp. 134-143.
Kundu, et al. "Methanol Reforming Processes." Advances in Fuel Cells. vol. 1. Elsevier, 2007. pp. 419-472.
Spath et al., "Preliminary Screening—Technical and Economic Assessment of Synthesis Gas to Fuels and Chemicals with Emphasis on the Potential for Biomass-Derived Syngas", NREL Technical Report, Dec. 2003, pp. 1-160.
Twigg, Martyn V. "Handling and Using Catalysts in the Plant." Catalyst Handbook. 2nd ed. CRC, 1989. p. 177.
Final Office Action U.S. Appl. No. 12/742,213, filed Aug. 23, 2010; dated Aug. 24, 2015; 6 pages.
Non-Final Office Action U.S. Appl. No. 12/742,213, filed Aug. 23, 2010; dated Apr. 23, 2015; 10 Pages.
"Black Liquor", Wikipedia, https://en.wikipedia.org/wiki/Black_liquor; downloaded Oct. 5, 2017; 4 pages.

* cited by examiner

USE OF METHANOL IN THE PRODUCTION OF HYDROGEN AND FUEL, PROCESSES AND PLANTS FOR THE PRODUCTION OF HYDROGEN AND FUEL

CROSS-REFERENCE TO RELATED APPLICATIONS

This application is a continuation of U.S. patent application Ser. No. 12/742,213 filed Aug. 23, 2010, which claims priority under 35 U.S.S. 371 to International Application No. PCT/EP2008/064675 filed on Oct. 29, 2008, which claims priority to Finland Application Serial No. 20085697 filed on Jul. 4, 2008, which claims priority to Finland Application Serial No. 20085400 filed Apr. 30, 2008, which claims priority to Finland Application Serial No. 20075794 filed on Nov. 9, 2007. These priority applications are incorporated by reference herein in their entirety.

FIELD OF THE INVENTION

The present invention relates to the use of biomethanol derived from the pulp industry in the production of biohydrogen. The preferred biomethanol comprises purified biomethanol derived from black liquor. The invention also relates to a process for the production of biohydrogen from biomethanol derived from black liquor and to a process for producing hydrocarbon biofuel using such biohydrogen as a hydrogen source. Finally, the present invention relates to a biofuel production facility for producing fuel from biohydrogen and biohydrocarbon, and to biofuel so produced.

The present invention provides improvements to known ways of utilizing biomaterials to produce biofuel by processes which produce hydrocarbons, such as Fischer-Tropsch and hydrodeoxygenation. The biohydrogen of the present invention can be used for upgrading the intermediate hydrocarbons to end products having desired chemical and physical properties. All the processes mentioned above require hydrogen as a reagent and many of the reactions preferably occur under hydrogen pressure.

The present invention provides an advantage for the wood processing industry by facilitating utilization of one of its low value by-products, namely biomethanol. The use of the biomethanol for the production of biohydrogen means that hydrocarbon biofuel products can be produced with 100% bio-character. In the prior art, the biofuel production was typically dependent on outside hydrogen usually produced by steam reforming of natural gas.

BACKGROUND OF THE INVENTION

The diminishing reserves of fossil fuels and the emission of harmful gases connected with their use have increased the interest in utilizing biological materials, especially from non-edible renewable resources for making liquid fuels capable of replacing fossil ones. Several prior art processes are known for producing liquid fuels from biological starting materials. One that has reached commercial success comprises the production of biodiesel (FAME) by transesterification of biomass-derived oils with alcohols.

Biofuel has also been successfully made from hydrocarbons produced from biomass gasification products via Fischer-Tropsch synthesis and from hydrocarbons produced by hydrodeoxygenation of triglycerides and fatty acids of biological origin. Furthermore, alcohols such as ethanol and methanol made from biological materials have been proposed for use as replacements for fossil fuels in combustion engines.

Methanol is the simplest one of the alcohols and it has the chemical formula of $CH_3OH$. It is used as a solvent and as an industrial chemical in the manufacture of a wide range of raw materials including formaldehyde, methyl tert-butyl ether (MTBE), acetic acid dimethyl terephtalate (DMT), methyl methacrylate (MMA) methyl amines, antifreeze agents, etc. Methanol has also been suggested for use in the production of non-fossil fuels such as fatty acid methyl esters (FAME), dimethylether (DME), methanol-to-gasoline (MTG) and methanol-to-olefins (MTO). Furthermore, methanol has been proposed as a source of hydrogen for fuel cells.

Methanol is also called "wood alcohol" because it was previously produced as a byproduct of the destructive distillation of wood. It is now mostly produced synthetically by a multi-step process in which natural gas and steam are reformed in a furnace to produce hydrogen and carbon monoxide. The hydrogen and carbon monoxide gases are then reacted under pressure in the presence of a catalyst to form methanol.

Biomethanol, i.e. methanol of biological origin can be produced from various sources. It is typically produced by anaerobic digestion of biomass such as residues from various agricultural or forestry crops, waste products of animal and human effluents, municipal wastes and landfills, sugar beet pulp, glycerol etc.

Black liquor formed in the Kraft pulping process has been proposed as a source for production of biomethanol for use as non-fossil fuel. In this case, the black liquor is gasified to produce a mixture of hydrogen and carbon monoxide (synthesis gas) which is then converted into methanol.

Biomethanol is also produced as a direct by-product in the pulping of wood. In the Kraft pulping process, undesired side reactions of sodium sulphide with various wood constituents result in the formation of a large number of different organic sulphur compounds. In the evaporation of the black liquor, a condensate containing biomethanol is obtained. However, this biomethanol is contaminated with said sulphur compounds and has a very unpleasant odour. The contaminated methanol is traditionally incinerated in the mill to recover its energy content and to destroy the foul odour components.

Purification of black liquor derived methanol has been described in the prior art. Thus, U.S. Pat. No. 5,450,892 discloses a process for the scrubbing of black liquor condensate stripper off-gases. The alkaline scrubbing removes gases such as hydrogen sulphide, methyl mercaptan, dimethyl sulphide and dimethyl disulphide and allows most of the methanol to remain in the scrubbed gases. The gases are then incinerated.

U.S. Pat. No. 5,718,810 discloses a process for the recovery of methanol from sulphur based wood-pulping processes using extractive distillation. According to the process, methanol is recovered from pulping process vapours which contain at least methanol and dimethyl sulphide. The vapours are distilled in two or three steps to provide methanol with a purity which may approach 100%.

In the production of hydrocarbon-based biofuels, the starting material is typically biomass which is gasified to provide synthesis gas or syngas. The synthesis gas is then led to a Fischer-Tropsch (FT) reactor to produce biohydrocarbons. Examples of suitable biomass sources include forest slash, urban wood waste, by-products and waste of the papermaking industry, lumber waste, wood chips, sawdust, straw, firewood, agricultural residue, dung and the like.

Gasifiers have been investigated for more than a century, and many different types have been developed. One drawback of biomass gasifiers still remains, however, namely their incapacity to produce a steady synthesis gas flow, having the optimum $H_2/CO$ ratio of about 2, to be utilized in the most effective cobalt based Fischer-Tropsch three-phase slurry synthesis. To correct the hydrogen to carbon monoxide ratio of the synthesis gas produced from biomass, make-up hydrogen is required.

Another possibility to produce hydrocarbon-based biofuels is to use biological triglycerides (bio-oils) or biological fatty acids (bio-acids) as starting materials. In order to make biofuel, the starting material is treated by a hydrodeoxygenation process (HDO). In the catalytic HDO process, hydrogen is combined with oxygen into water thus releasing the desired paraffinic biohydrocarbon backbone for chemical manipulation.

The subsequent phase in the biofuel production after the FT or HDO process comprises biohydrocarbon product upgrading. The upgrading processes typically comprise cracking and/or isomerization processes requiring hydrogen. Advantageously, one-dimensional molecular sieve catalysts such as Pt/Mordenite, Pt-SAPO's or Pt-ZSM-23,22 or equivalent are used to get a suitable, diesel range molecular length of the biohydrocarbon and to provide a side chain structure determining a desired cloud point and cetane value. Typically these upgrading processes employ relatively high hydrogen pressures without any significant hydrogen consumption.

Steam reforming of natural gas is the most common method of producing commercial bulk hydrogen. It is also the least expensive method. It is based on the idea that at high temperatures (700-1100° C.) and in the presence of a nickel-based catalyst, steam reacts with methane to yield hydrogen according to the equation $$CH_4+H_2O \rightarrow CO+3H_2$$

Additional hydrogen can be recovered by a lower-temperature gas-shift reaction with the carbon monoxide produced.

Make-up hydrogen can also be produced from the synthesis gas obtained from the biomass and from tail gases of the biofuel fractionation. A standard procedure for providing more hydrogen is the well known water gas shift (WGS) reaction ($CO+H_2O \rightarrow CO_2+H_2$). However, the WGS reaction has its drawbacks. The WGS reaction is a catalytic process, hard to control and sensitive to synthesis gas impurities. Moreover, because the WGS reaction utilizes carbon monoxide, which is part of the synthesis gas, it lowers the total carbon conversion of the whole process scheme.

Thus, there exists a need for providing alternative sources of hydrogen for the production of biofuels. In order to provide a 100% biological and non-fossil fuel, a biohydrogen product is needed at reasonable costs. The biohydrogen should preferably be provided without utilizing carbon monoxide in a WGS reaction, since carbon monoxide is a component, which makes up the building blocks of the biohydrocarbon fuel. The present invention strives to satisfy that need. The present invention provides biohydrogen from a waste product of the pulp industry, namely from biomethanol.

SUMMARY OF THE INVENTION

The present invention relates to the use of biomethanol derived from the pulp industry for the production of biohydrogen. The biomethanol typically comprises purified biomethanol derived from spent pulping liquor or black liquor. Biomethanol can be recovered from the black liquor e.g. by distillation and/or stripping. The biomethanol is purified before it is used in the production of biohydrogen. Further purification steps may be performed on the biohydrogen gas prior to use in the production of biohydrocarbon fuel.

In one embodiment, the biohydrogen is used in a biofuel production facility integrated with a pulp and/or paper mill.

The present invention also relates to a process for the production of biohydrogen, wherein crude biomethanol recovered from black liquor is purified and reformed, where after biohydrogen is recovered. The purification removes malodorous sulphur impurities which contaminate crude biomethanol produced in the Kraft pulping of wood.

The invention further relates to a process for producing hydrocarbon biofuel which comprises steps, wherein
a) crude biomethanol recovered form black liquor is purified and reformed to provide biohydrogen and purified biohydrogen is recovered;
b) a biohydrocarbon stream is produced by a process selected from a Fischer-Tropsch reaction of syngas produced from biomass, a hydrodeoxygenation of biological triglycerides or fatty acids and combinations thereof, wherein
c) said biohydrocarbon stream production of step b) includes at least one process step selected from adjusting the hydrogen to carbon monoxide ratio of syngas, cracking/isomerization of Fischer-Tropsch paraffins, hydrodeoxygenation of said biological triglycerides or fatty acids, hydroisomerization of n-paraffins, and reduction of catalysts; and
d) said purified biohydrogen recovered in step a) is used as a hydrogen source in at least one of the process steps defined in step c) and the biohydrocarbon stream produced is separated into fractions and biofuel is recovered from at least one of said fractions.

The biomethanol may be reformed together with gaseous stream(s), which emanate from one or more process steps of the biofuel production process and which contain gaseous components capable of forming hydrogen by reforming. The resulting biohydrogen is typically used directly in the biofuel production.

The present invention also relates to an integrated pulp/biofuel production facility, which comprises a Kraft pulp mill, which provides black liquor; a recovery unit for recovering of crude biomethanol from said black liquor; a methanol purification unit for purification of said crude biomethanol to produce purified biomethanol; a reforming unit for reforming of said purified biomethanol to produce a gas mixture containing biohydrogen; a hydrogen purification unit for purification of said gas mixture to provide purified biohydrogen; and a biofuel production plant, which produces biohydrocarbon based biofuel from said biohydrogen and from biomass.

In one embodiment of the invention, the biomass comprises biological waste and/or by-products of the Kraft pulp mill such as forest residue, slash, bark, wood chips, black liquor, tall oil and tall oil fatty acids, etc. The pulp mill and the biofuel production plant are preferably integrated by one or more further units.

An end product of the present invention is biofuel made of waste and/or by-products of wood processing industry, which biofuel is made of biohydrocarbon produced from biological waste and/or by-products of a Kraft pulp mill and biohydrogen produced from black liquor.

DETAILED DESCRIPTION OF THE INVENTION

The present invention relates to the production of biohydrogen for use in the production of biofuel. In one embodiment, the invention relates an integrated industrial concept, wherein a biofuel production plant utilizes the biological waste and/or by-products of an adjacent pulp mill for the production of valuable biofuel which can replace fossil fuels.

In the present specification and claims, the following terms have the meanings defined below.

The term "biomethanol" refers to methanol $CH_3OH$ produced from biological sources, that is from renewable biological (non-fossil) sources. Typically the biomethanol of the present invention is produced from spent pulping liquor (black liquor).

The terms "biohydrogen" and "biohydrocarbon" refer to hydrogen and to hydrocarbon, respectively, produced from biological sources, i.e. from renewable biological (non-fossil) sources.

The terms "biological", "biomaterial" and "biological origin" refer to a wide variety of materials derived from plants, animals and/or fish, i.e. from biorenewable sources as opposed to fossil sources.

The term "biomass" includes any kind of material of biological origin which is suitable for being gasified for producing synthesis gas and/or which contains triglycerides and/or fatty acids suitable for the production of hydrocarbons. The biomass is typically selected from virgin and waste materials of plant, animal and/or fish origin, such as municipal waste, industrial waste or by-products, agricultural waste or by-products (including also dung), waste or by-products of the wood-processing industry, waste or by-products of the food industry, marine plants (such as algae) and combinations thereof. The biomass material is preferably selected from non-edible resources such as non-edible wastes and non-edible plant materials, including oils, fats and waxes.

A specific biomass material according to the present specification and claims comprises "biological waste and/or by products of wood-processing industry". This wood-derived biomass includes forest residues, wood slash, bark, urban wood waste, lumber waste, wood chips, sawdust, straw, firewood, wood materials, paper, pulp, by-products of the papermaking or timber processes, black liquor, tall oil and tall oil fatty acids, etc.

The term "wood-processing industry" refers to any kind of industry that uses wood as its raw material. Typical wood-processing industries comprise pulp and paper mills, saw mills, panel board companies, fire-wood producers, wood pelletizers, etc.

The term "biological waste and/or by-products of a Kraft pulp mill" refers to any biological waste and/or by-products which are created in connection with a Kraft pulping process and which can be used in the production of hydrocarbons. The term refers typically to forest residue, slash, bark, wood chips and black liquor as well as to tall oil and tall oil fatty acids.

The term "biofuel" refers to fuel produced mainly or wholly from biological sources. The biofuels of the present invention are practically free of oxygen.

The term "biodiesel" refers in this specification only to those traditional biological fuel products which are produced from trans-esterification of biomass-derived oils with alcohol and which contain oxygen.

The "spent pulping liquor" or "black liquor" is an aqueous solution of lignin residues, hemicellulose, and the inorganic chemicals used in a Kraft pulping process.

The term "middle distillate" refers to a hydrocarbon fraction, wherein the hydrocarbons consist essentially of hydrocarbons typically having a carbon chain length of 11 to 20.

The term "heavy fraction" refers to a hydrocarbon fraction, wherein the hydrocarbons consist essentially of hydrocarbons having a carbon chain length above 20.

The term "naphtha fraction" refers to a distilled hydrocarbon fraction, wherein the hydrocarbons consist essentially of hydrocarbons having a carbon chain length of 5 to 10.

The term "light fraction" refers to a hydrocarbon fraction, wherein the hydrocarbon chain length is 1 to 4. The light fraction also includes other gaseous components such as hydrogen and carbon monoxide, depending on the process from which the light fraction derives.

The term "synthesis gas" or "syngas" refers to a gas mixture that contains varying amounts of carbon monoxide and hydrogen generated by the gasification of a carbon containing substance. Gasification of biological materials provides a ratio of hydrogen to carbon monoxide, which is close to 2. The gas is suitable for providing hydrocarbons by the Fischer-Tropsch synthesis after some additional hydrogen has been added.

The term "biomass-to-liquid" BTL refers to a multi step process to produce liquid biofuels from biomass. The process uses the whole plant to improve the $CO_2$ balance and increase yield. The main process used for BTL is the Fischer-Tropsch process.

The "Fischer-Tropsch" (FT) synthesis is a catalyzed chemical reaction in which hydrogen and carbon monoxide (synthesis gas) are converted to a substantially Gaussian distribution of hydrocarbon chains of various lengths. Typical catalysts used are based on iron and cobalt.

The "catalytic hydrodeoxygenation" (HDO) used in the present specification and claims refers to a catalytic treatment of the biological triglyceride (oil, fat, wax) and/or fatty acid feed with hydrogen under catalytic conditions, wherein the following reactions take place: breaking down of the triglyceride structure, deoxygenation or removal of oxygen as water, and hydrogenation to saturate double bonds. The preferred HDO of the invention also removes non-desired impurities such as sulphur as hydrogen sulfide and nitrogen as ammonia. Useful HDO catalysts are, for instance, those mentioned in U.S. Pat. No. 7,232,935 as suitable for the HDO step described therein.

The terms "isomerization" and "hydroisomerization" refer to the catalytic and hydrogen assisted introduction of short chain (typically methyl) branches into n-paraffinic hydrocarbons.

The term "non-cracking hydroisomerization", which is used for the HDO hydrocarbon stream of the present invention, refers to an isomerization performed with a catalyst known to have little or no effect on cracking of the hydrocarbons in question. Typical non-cracking catalysts comprise intermediate pore size silicoaluminophosphate molecular sieve (SAPO) catalysts. Useful non-cracking isomerization catalysts are, for instance, those mentioned in U.S. Pat. No. 7,232,935 for the isomerization step described therein.

The term "catalytic cracking/isomerization", which is used for the FT produced paraffins according to the present invention refers to a simultaneous cracking and hydroisomerization step occurring according to the so called carbocation mechanism (G. A. Olah et al., Superacids, Wiley-Interscience, 1985, Chapter 5). Typical isomerization catalysts have both hydrogenation-dehydrogenation (Pt, Pd) and acidic functions (molecular sieves). The process is performed in the presence of hydrogen with a catalyst known to have both cracking and isomerizing properties. Typical cracking/isomerizing catalysts include ZSM zeolite catalyst such as the ZSM-5 and ZSM-23 catalysts described U.S. Pat. Nos. 4,222,855, 4,229,282 and 4,247,388 for use in selective cracking and isomerization of a paraffinic feedstock such as a Fischer-Tropsch wax.

The term "autothermal reforming" (ATR) refers to the catalytic production of hydrogen from feed stocks such as hydrocarbons and methanol by the combination of partial oxidation and steam reforming.

The term "water gas shift" (WGS) refers to the inorganic chemical reaction in which water and carbon monoxide react to form carbon dioxide and hydrogen (water splitting).

The term "recovery" as used in connection with biomethanol and biohydrogen in the present specification and claims does not necessarily imply that the methanol or hydrogen in question is separated out into a product of its own. The term also applies to the direct use of the obtained methanol or hydrogen, respectively, in a subsequent process.

An "integrated process" means a process wherein two or more related functions, which can be separately performed, are combined so that at least one significant process step is common for the two processes.

The term "cetane number" or "cetane value" relates to the ignition quality of diesel fuel. It is a value obtained by a standardized comparison of the fuel under analysis with fuels or blends with a known cetane number. The reference fuel n-cetane ($C_{16}$) has the cetane number 100.

The embodiment, which is of particular interest for the present invention, relates to the recovery of methanol from black liquor. The crude biomethanol may be recovered by stripping and/or distilling of the black liquor, or it may be recovered as a by-product in the distillation of tall oil, which is produced via acidulation of the black liquor.

The biomethanol is a low value side product of pulp production and it has typically been burned for energy. According to the present invention, however, biomethanol derived from black liquor is used as a source for biohydrogen for the FT and/or HDO processes via a reforming process.

Biomethanol derived from black liquor contains a number of nitrogen and sulphur compounds originating from pulping process chemicals. Some nitrogen compounds also originate from the de-amination of wood proteins during the pulping process.

The various compounds, especially the nitrogen and sulphur compounds, included in crude biomethanol may harm the conversion catalysts used in the production of the biofuel and extra purification steps are needed to make the biomethanol sulphur free for the catalytic steps.

The crude biomethanol may be purified by process steps such as washing, scrubbing, stripping, liquid-liquid separation, distillation, catalytic conversion, ion exchange, absorption and adsorption. Special adsorbents, ion-exchangers, catalysts and cleaning devices are available on the market.

It has been found that ammonia is the most abundant among the nitrogen compounds and that sulfides such as hydrogen sulphide, dimethyl sulphide, dimethyl disulphide and methanethiol are the most abundant among the sulphur compounds. All of these compounds are gases or low boiling liquids, and they are removable by stripping and/or distilling. The biomethanol also contains thiol compounds, which have a mercapto group (—SH) in their molecules. These are considered as being responsible for the undesireable smell of the pulp biomethanol. The stripped and/or distilled biomethanol still contains some higher molecular weight impurities, which are removed e.g. by adsorption. Suitable adsorbents are available on market. At need, combinations of adsorbents, washers, catalysts, etc. may be used.

For instance, ZnO based adsorbent materials are able to adsorb organic sulphur compounds and can be used to purify biomethanol to an acceptable level. Some sulphur compounds and especially carbon dioxide may be removed by a purification process, which includes subjecting the crude biomethanol stream to refrigerated methanol at a high pressure. The refrigerated methanol acts as a physical solvent and absorbs impurities from the biomethanol. The absorbed impurities are subsequently removed from the physical solvent by lowering the pressure and/or steam stripping. Solvents which rely on chemical reactions to remove impurities and catalysts which degrade impurities can also be used to purify the biomethanol used in the present invention. The processes outlined in U.S. Pat. Nos. 5,450,892 and 5,718,810 mentioned above, may also be used in the purification of the biomethanol of the present invention. Combinations of different purification processes provide the best results.

The purified biomethanol may still contain some high molecular weight sulphur and nitrogen compounds. These compounds will pass into the reformer with the methanol and will degrade there to smaller compounds, finally to ammonia and hydrogen sulphide, which pressure swing adsorption (PSA) molecular sieve adsorbents are capable of adsorbing.

The purified biomethanol is subjected to reforming, typically in an autothermal reforming (ATR) process. Also steam reforming with a separate heat source may be used. The ATR converting unit is a technology which is known as such to those skilled in the art and available in the markets. The principles of steam reforming are also known to those skilled in the art.

It is well known in the art that methanol can be reformed to hydrogen by various methods other than autothermal reforming. However, since reforming is an endothermic reaction, it will need an outside energy source to be able to maintain the reaction. Unless cheap outside fuel is available, it is reasonable to utilize part of the feed methanol as a fuel to maintain the optimal reaction temperature for reforming, providing autonomous reforming.

Autothermal reforming of methanol is a combination of exothermic partial oxidation of methanol and endothermic water gas shift of carbon monoxide producing carbon dioxide and hydrogen.

$$4CH_3OH+3H_2O \rightarrow 4CO_2+11H_2$$

The idea was developed in the late 1980s by Johnson-Matthey and it has a net reaction enthalpy change of zero. As a consequence, a reactor for this process does not require external heating once having reached reaction temperature.

The maximum obtainable hydrogen content in the product gas is 65% using the stoichiometry at 300° C.

After reforming, the resulting biohydrogen is suitably further purified and separated from the produced $CO_2$. A pressure swing adsorption (PSA) unit or the like means is suitably used for the purification and separation. The resulting purified biohydrogen is ready for further use.

The biohydrogen produced from the black liquor is advantageously utilized in a process for producing hydrocarbon biofuel.

The biohydrocarbon for the biofuel may be produced either by a Fischer-Tropsch (FT) reaction of synthesis gas produced by gasification of biomass or by hydrodeoxygenation (HDO) of biological triglycerides or fatty acids. The biohydrocarbon may of course also be blended from hydrocarbons produced by both process types.

The biomass material for the gasification may be any biomass material suitable for the production of synthesis gas. In a preferred embodiment of the present invention the biomass comprises biological waste and/or by-products of wood-processing industry. In an embodiment of the invention, the wood-processing industry comprises a Kraft pulp mill and the biomass comprises biological waste and/or by-products of the mill.

After gasification of the biomass feedstock an FT reaction is used to produce hydrocarbons from the hydrogen and carbon monoxide of the synthesis gas. The biohydrogen produced from the biomethanol according to the invention is used to adjust the $H_2$ to CO ratio of the produced synthesis gas to about 2, which is suitable for the FT reaction. The reaction provides biohydrocarbons having varying chain lengths.

After removal of off-gases, the remaining biohydrocarbons are subjected to cracking/isomerization to shorten the chain lengths. In this reaction the biohydrogen of the invention may again be used to provide a sufficient hydrogen pressure. The cracking increases the proportion of $C_{11}$-$C_{20}$ paraffins in the biohydrocarbon stream. At the same time, the isomerization provides branched hydrocarbons which improve the cloud point of the end product fuel.

The biomass for the hydrodeoxygenation (HDO) process may be any triglyceride or fatty acid material, which is suitable for the production of hydrocarbons by the HDO process. Such material typically comprises non-edible oils such as jatropha oil, castor oil, tall oil or tall oil fatty acids (TOFA), etc. In a preferred embodiment of the present invention, the biomass comprises a biological by-product of wood processing industry, such as tall oil or tall oil fatty acids. The biohydrogen produced from the biomethanol may be used in the HDO process, which provides a stream of saturated n-paraffins rich in biohydrocarbons with 16 and 18 carbon chains.

The HDO treatment also saturates any unsaturated chains. The n-paraffins are typically hydroisomerized to increase the proportion of i-paraffins in the biohydrocarbon stream. The biohydrogen of the present invention provides a suitable hydrogen feed to provide the required hydrogen pressure for the non-cracking hydroisomerization catalyst. The hydroisomerization may be performed in a separate isomerization reactor or it may be performed in the same reactor with the hydrodeoxygenation.

From time to time the catalysts used in the biofuel production process steps need to be regenerated by reduction with hydrogen. This may also be performed using the biohydrogen of the present invention. The role of the hydrogen catalyst regeneration is twofold: firstly, to reduce the active metal back to the zero valent metallic state, and secondly, to flush out the heavy wax components eventually blocking the catalyst system.

The hydrogenated and/or isomerized biohydrocarbon stream(s) from the FT and/or HDO processes is/are subsequently separated into fractions suitable for biofuel use. Typical fractions include a light fraction, a naphtha fraction, a middle distillate fraction and a heavy fraction. The middle distillate comprises a desirable hydrocarbon biofuel since it has an ideal boiling point range, a good cetane value and cloud point, and it can replace fossil diesel fuel.

In an advantageous embodiment of the invention, the biofuel production facility is integrated with a pulp and/or paper mill. In such a case, biological waste and/or by-products of the mill are suitably used as biomass for gasification to syngas. When the mill comprises a Kraft pulp mill, black liquor typically serves as a source for the biomethanol and tall oil or tall oil fatty acids may serve as feedstock for a HDO process.

A typical integrated pulp/biofuel production facility comprises a Kraft pulp mill, which provides black liquor containing biomethanol. The integrated facility includes units for recovery, purification and reforming of said biomethanol and units for purification and recovery of the produced biohydrogen. A biofuel production plant is provided, which produces biohydrocarbon based fuel from the biohydrogen and from biomass comprising biological waste and/or byproducts of the Kraft pulp mill.

The biomethanol recovery unit includes one or more stripping units and/or distillation units for the recovery of crude biomethanol. Since the pulp biomethanol has a foul smell and contains impurities which may harm the catalysts, various units may be provided for purification of the crude biomethanol. These include means selected from a scrubbing unit, a washing unit, a stripping unit, an adsorbing unit, an absorbing unit, a catalytic reactor unit, and combinations thereof.

After purification, the biomethanol is reformed to produce hydrogen. The most advantageous reforming unit is an autothermal reforming unit, although a steam reforming unit may also be used.

The gas produced in the reformer includes impurities, that is, other gases besides biohydrogen, and the plant accordingly includes means for purification of the biohydrogen. The hydrogen purification unit typically includes a pressure swing adsorbing unit (PSA), which is capable of providing pressurized and purified biohydrogen.

The biofuel or BTL plant of the inventive biofuel facility is of a well known design, comprising either an FT or a HDO reactor or both. The separation and recovery of the biofuel is performed in a well known manner.

According to an embodiment of the invention a biofuel product is made of waste and/or by-products of wood processing industry. The biofuel is advantageously made of biohydrocarbons produced from biological waste and/or by-products of a Kraft pulp mill and biohydrogen produced from biomethanol from black liquor.

The following examples are given to further illustrate the invention and are not intended to limit the scope thereof.

Example 1

Figure 1:
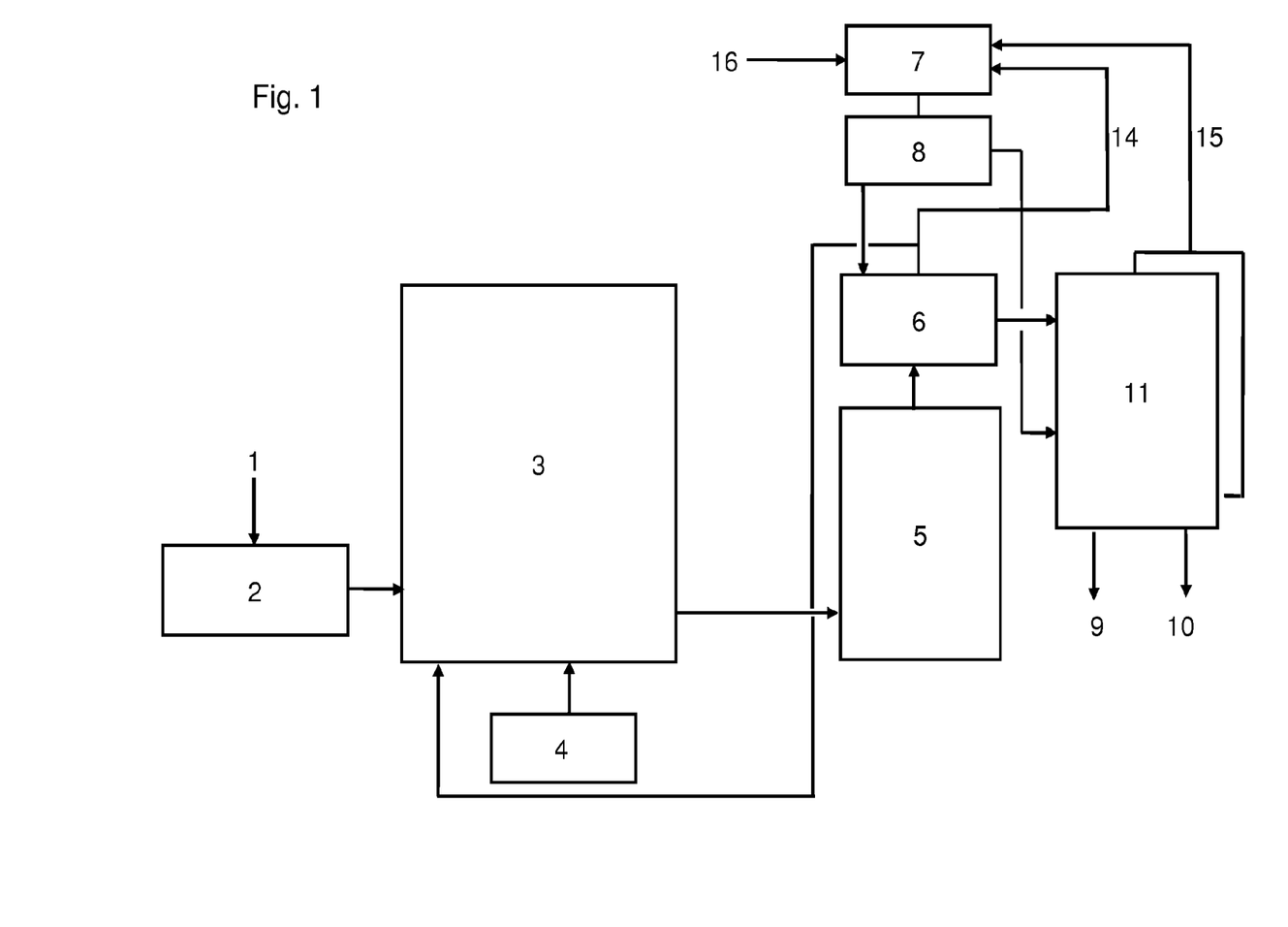
FIG. 1 is a schematic diagram of the production of biofuel using biohydrogen from pulp biomethanol.

FIG. 1 shows a schematic flow diagram of a biomass-to-liquid (BTL) process located in close connection to and integrated with a Kraft pulp and paper mill (not shown). The BTL process produces biofuel using biohydrogen derived from pulp biomethanol.

The biomass-to-liquid process comprises feeding of biomass 1 to a feed stock pretreatment unit 2, where after the feed stock is led to a gasification and gas conditioning unit 3 for synthesis gas production. The gasification and gas conditioning unit 3 includes i.a. scrubbing of the gas and a water gas shift (WGS) unit. The unit 3 is connected to an air separation unit (ASU) 4 for production of oxygen. Before the Fischer-Tropsch (FT) synthesis unit 6, the gas is treated in a gas processing and clean-up unit 5.

Biohydrogen is produced in an autothermal reforming (ATR) unit 7 from purified biomethanol 16 recovered from the Kraft pulp mill. Also tail gases 14 and off-gases 15 from the BTL process are fed to the ATR unit 7 for reforming. The resulting biohydrogen is purified and separated out in a pressure swing adsorption (PSA) unit 8. The purified biohydrogen is fed to the FT synthesis unit 6 to adjust the $H_2$ to CO ratio of the reacting gas to about 2.

The product gas of the FT synthesis unit 6 is led to a product upgrade unit 11. FT tail gases 14 and off-gases 15 are removed from the FT synthesis unit 6 and product upgrade unit 11, respectively, and directed to the ATR unit 7. Naphtha 9 and middle distillate 10 fractions are obtained as fractions of the FT product gas from upgrade unit 11.

Example 2

Figure 2:
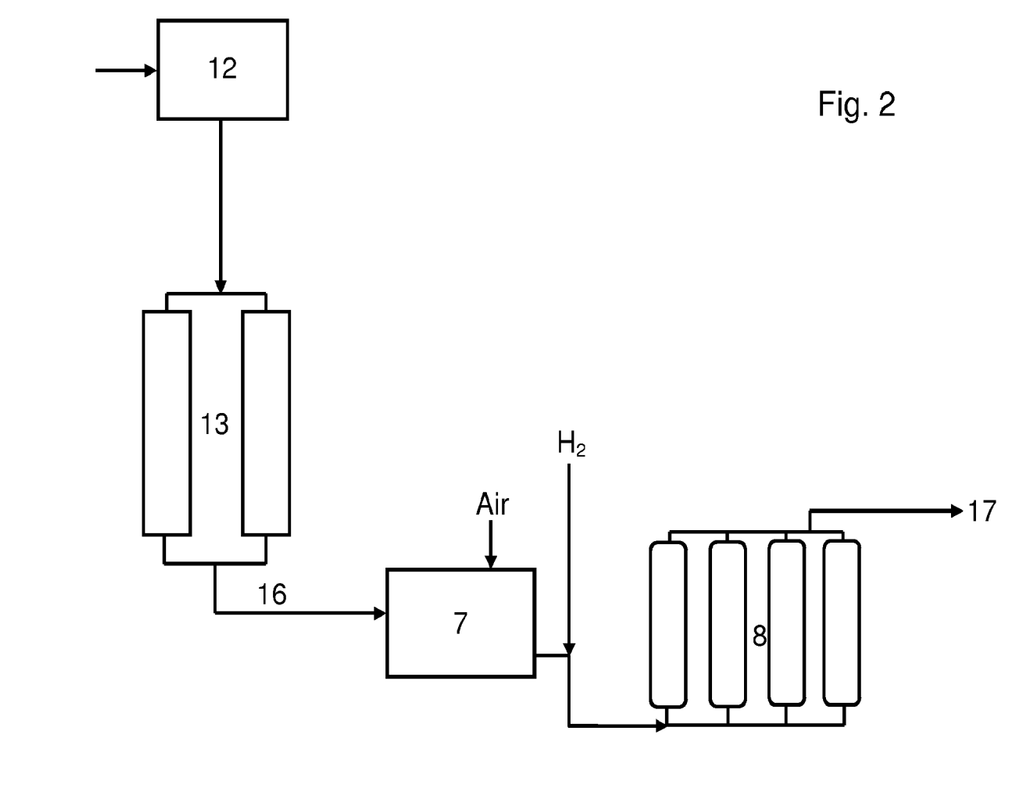
FIG. 2 is a schematic diagram of a production of biohydrogen from crude biomethanol from a pulping process.

Biohydrogen is produced from crude biomethanol recovered from a Kraft pulping process in accordance with the diagram shown in FIG. 2.

Crude biomethanol produced in the Kraft pulping process is distilled and/or stripped in recovery unit 12 and is introduced into a methanol purification unit 13 that is capable of removing sulphur compounds. In the shown embodiment, the purification unit 13 comprises two absorbers, each containing an adsorbent bed. The adsorbers are used alternately, one being in use, while the other is regenerated. Further purification means such as scrubbers, washers, absorbers, and catalytic reactors may be added at need.

The purified biomethanol is directed to an autothermal reforming unit (ATR) 7, to which also air is introduced. The ATR unit 7 produces a gas mixture containing biohydrogen, carbon dioxide, nitrogen, ammonia and hydrogen sulphide. The gas also contains minor amounts of higher molecular weight sulphur compounds of a malodorous nature. The gas mixture is mixed with recirculated biohydrogen $H_2$ and then directed to a hydrogen purification unit 8 comprising a pressure swing adsorber (PSA) bank. The gas is purified in the adsorbents, and pressurized biohydrogen 17 having a purity above 99% is recovered.

Example 3

Figure 3:
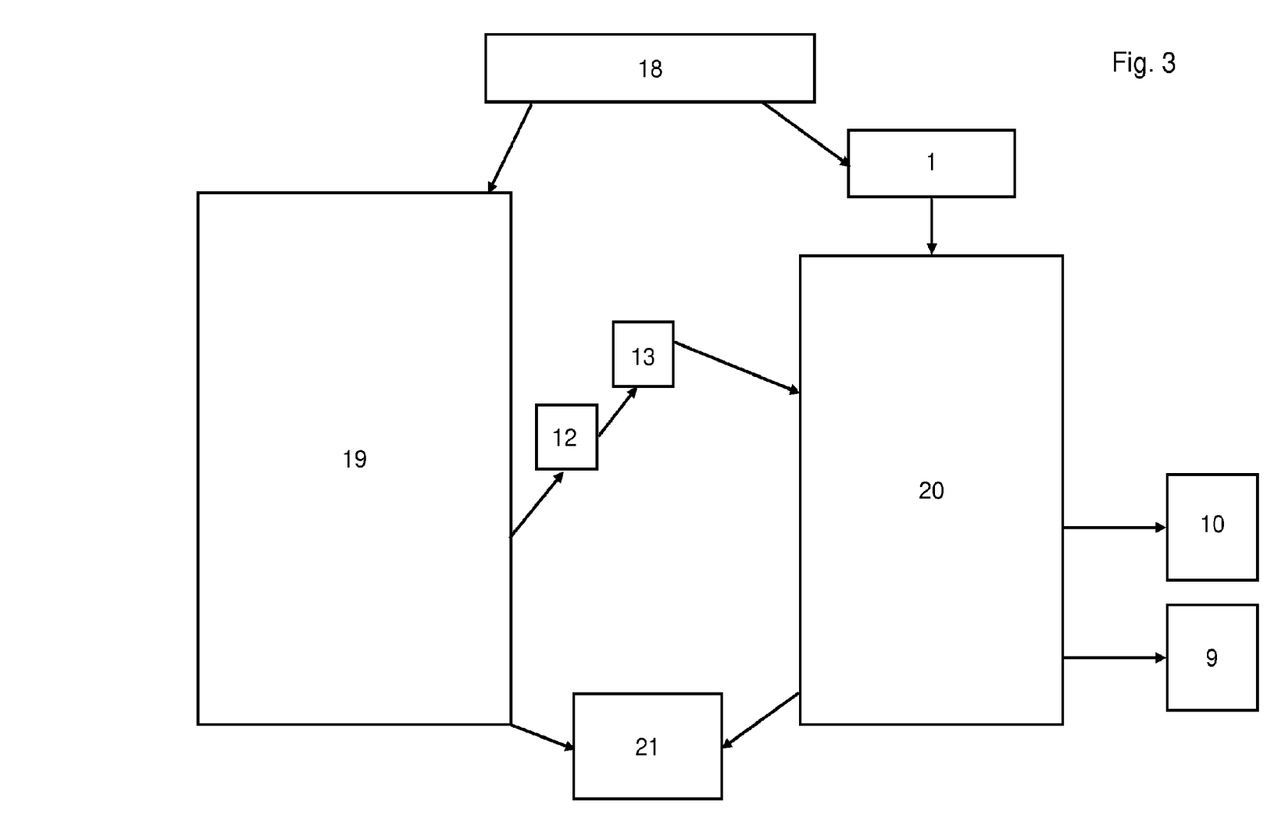
FIG. 3 is a schematic diagram of the use of biohydrogen produced in a pulp mill integrated with a biofuel production plant.

FIG. 3 is a schematic flow diagram of the use of biohydrogen produced in a Kraft pulp mill 19 integrated with a biofuel production plant 20.

Wood for the pulp mill 19 is procured and handled in wood logistics facility 18 for use as raw material in the production of pulp. Bark recovered in the wood handling of the facility 18 is incinerated in the boiler (not shown) of the pulp mill 19 for energy production. Energy wood (mainly forest residue) 1 from the common wood logistics facility 18 is fed to the biomass-to-liquid (BTL) plant 20.

In this example about 2.1 TWh/a (terawatt hours/annum) or about 1 Mio $m^3$/a (millions of cubic meter/annum) of forest residue is fed to the BTL plant 20. The BTL process produces 65,000-88,000 t/a (metric ton/annum) of middle distillate and 20,000-27,000 t/a of naphtha. The Kraft pulp process produces about 600,000-700,000 t/a pulp.

The Kraft pulp mill 19 produces black liquor from which about 20,000 t/a crude biomethanol is recovered in recovery unit 12 by stripping and distilling. The crude pulp biomethanol is pre-purified in absorbers 13 and all or a part thereof is directed to an ATR unit of the BTL plant 20 to provide make-up biohydrogen, when the hydrogen created within the BTL process is insufficient.

The integrated pulp/paper mill 19 and BTL plant 20 will advantageously also have other integrated processes in addition to the above mentioned wood raw material and biomethanol feeds. Thus, steam, power, gas and water may be transported between the processes and/or may be handled in an integrated devices. FIG. 3 shows as an example of further integration an integrated water purification facility 21. In this case, the BTL process uses a cobalt catalyst in its Fischer-Tropsch synthesis and, consequently, alcohol-contaminated water is produced in the BTL process. The contaminated water is diluted with water from the pulp and paper mill 19 and then treated in a common biological purification process unit 21. Contaminated water from the pulp and paper mill 19 is purified in the same waste water purification unit 21.

The present invention has been described herein with reference to specific embodiments. It is however clear to those skilled in the art that the process(es) may be varied within the bounds of the claims.

The invention claimed is:

1. A process for the production of biohydrogen, comprising:
   recovering crude biomethanol from black liquor;
   purifying the crude biomethanol to form purified biomethanol;
   reforming the purified biomethanol to form a gas mixture comprising biohydrogen; and
   recovering biohydrogen from the gas mixture;
   wherein said reforming comprises autothermal reforming; and
   wherein said purifying the crude biomethanol is by a process consisting of at least one step selected from the group consisting of washing, scrubbing, liquid-liquid separation, catalytic conversion, ion exchange, absorption and adsorption.

2. The process according to claim 1, wherein said recovering biohydrogen from the gas mixture comprises separating biohydrogen from carbon dioxide in a pressure swing adsorption unit.

3. A process for producing hydrocarbon biofuel, comprising:
   recovering crude biomethanol from black liquor;
   purifying the crude biomethanol to form purified biomethanol;
   reforming the purified biomethanol to provide a gas mixture comprising biohydrogen;
   recovering the biohydrogen from the gas mixture;
   purifying the recovered biohydrogen to produce purified biohydrogen;
   producing a biohydrocarbon stream by a process selected from a Fischer-Tropsch reaction of syngas produced from biomass and a hydrodeoxygenation of biological triglycerides, fatty acids and combinations thereof, wherein said biohydrocarbon stream production includes at least one process step selected from adjusting a hydrogen to carbon monoxide ratio of syngas, cracking/isomerization of Fischer-Tropsch paraffins, hydrodeoxygenation of said biological triglycerides or fatty acids, hydroisomerization of n-paraffins, and reduction of catalysts;

using said purified biohydrogen as a hydrogen source in at least one of the biohydrocarbon stream production process steps;

separating the biohydrocarbon stream into fractions; and recovering biofuel from at least one of said fractions;
wherein said reforming comprises autothermal reforming; and wherein said purifying the crude biomethanol is by a process consisting of at least one step selected from the group consisting of washing, scrubbing, liquid-liquid separation, catalytic conversion, ion exchange, absorption and adsorption.

4. A process according to claim 3, wherein said producing a biohydrocarbon stream is by a Fischer-Tropsch reaction of syngas produced from biomass, wherein said biomass comprises biological waste or by-products of wood processing industry.

5. A process according to claim 3, wherein said producing a biohydrocarbon stream is by a hydrodeoxygenation of biological triglycerides, fatty acids, and combinations thereof, wherein said triglycerides or fatty acids comprise tall oil or tall oil fatty acids.

6. A process according to claim 5, wherein said biomethanol is reformed together with gaseous stream(s), which emanate(s) from one or more process steps of said biohydrocarbon stream production and which contain(s) gaseous components capable of forming hydrogen by reforming.

* * * * *